UNITED STATES PATENT OFFICE.

EUGEN SCHAAL, OF STUTTGART, WÜRTEMBERG, GERMANY.

MANUFACTURE OF RESIN-ACID ETHERS.

SPECIFICATION forming part of Letters Patent No. 335,435, dated February 2, 1886.

Application filed October 11, 1884. Serial No. 145,295. (Specimens.) Patented in England September 25, 1884, No. 12,807.

*To all whom it may concern:*

Be it known that I, EUGEN SCHAAL, doctor of philosophy, a subject of the King of Würtemberg, residing at Stuttgart, in the Kingdom of Würtemberg, Germany, have invented new and useful Improvements in the Manufacture of Resin-Acid Ethers, (for which I have obtained Letters Patent in Great Britain No. 12,807, dated September 25, 1884,) of which the following is a specification.

This invention relates to a process for producing resin-acid ethers by separating from raw resin acids their soft and volatile constituents, and then treating the residue with alcohol or phenol at a high temperature. The resin-acids freely combine with carbon hydrates, also with the lower and higher alcohols, the phenols, and naphthols, and similar aromatic hydroxylic derivatives by separation of water to form resin-acid ethers, which are a class of compound ethers that have the common property of being insoluble in sodic-hydrate, thus differing from most of the natural gum resins, which are soluble in sodichydrate. The resin-acid ethers are partly soft and partly very hard resinous bodies, which can be advantageously employed in the same manner as the natural resins for varnishing and such like purposes.

For conversion into resin-acid ethers are suited not only the natural resin acids, but also those artificially extracted from the gum resins, which have been freed from their softer portions. This separation of volatile ingredients or purification of the resin acids can be effected, first, by distilling *in vacuo* at from 300° to 350° centigrade, or by distilling with superheated steam, or with a current of a neutral gas; second, by extracting the mixture of resin acid and neutral ingredients by solvents, such as dilute alcohol.

I have employed for conversion into resin-acid ethers the resins of conifers—such as colophony—and also resinous bitumens—such as are obtained by the oxidation of petroleum and of the hydrocarbons resulting from distillation of coal, slate, peat, and the like. Almost all classes of alcohols can be employed, including the methyl, ethyl, batyl, cetyl, and ceryl alcohols, and alcoholic substance from petroleum, and the simple or multiple acid phenols, naphthols, phenanthrol, anthol, glycerine, mannite, and the carbohydrates.

The resin-acid ethers may be made, *a*, by heating to a high temperature the materials mixed in the proportions of their equivalents with or without pressure and with or without addition of substances capable of absorbing water—such as acids or acid salts; *b*, by passing through them heated neutral gases, so as to drive off the water that is formed; *c*, by heating the metallic salts of the resin acids with haloid or sulpho combinations of the phenols and their homologues.

The production of resin-acid ethers can also be effected from resin acids and hydrocarbons by treating them with glacial acetic acid or glycerine, but in this case a mixture of ethers is the final product of the reaction. When the formation of ether has been completed, the excess of alcohol or other medium used in the reaction is removed by treatment with water or by distillation. The residual mass is then separated by distilling *in vacuo* at 240° to 350° centigrade into more volatile ethers, which can take the place of mastic, dammara, or sandaræ, and very hard ethers which can be used as substitutes for copal and amber.

Example: By distilling colophony *in vacuo* at a temperature up to 350° centigrade the volatile ingredients are driven off, and to the residue, which consists chiefly of a hard resinous substance, is added ten per cent., by weight, of anhydrous glycerine. The mixture is heated with agitation, and under a pressure of several atmospheres to 250° centigrade. After some time the pressure rises by formation of water in the form of steam, which is permitted to escape. When the formation of water ceases, the operation is stopped, and the raw resin-acid ethers which have been formed by the above treatment are subjected to distillation for the purpose of separating the mass into softer and harder bodies of a resinous character.

The treatment of other materials can be readily understood from the above example, such treatment being adapted to the peculiar properties of the material to be treated without altering the general character of the process. In all cases, however, the success of the treatment depends upon the removal of the water which forms during the operation of heating the resin-acid together with the alcohol, since, if this water is not removed, no resin-acid ether is obtained.

The process may be illustrated by the following formula, in which X represents the resin radicle:

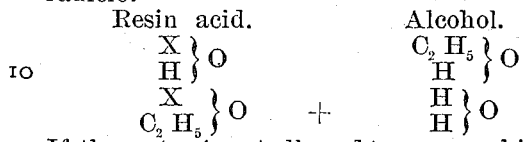

If the water is not allowed to escape while the heating progresses, no formation of ether takes place, since the water has a tendency to decompose the ether.

What I claim as new, and desire to secure by Letters Patent, is—

The method of preparing resin-acid ethers by freeing raw resin-acids in the first instance from volatile or soft constituents by distillation or extraction, the hard resin-acid residues being then condensed to ether by treatment with alcohols or phenol in the presence of heat, with or without pressure, and with or without addition of substances favoring the reaction, and, lastly, by separating the resin-acid ether into softer and harder resin-like bodies by distilling them *in vacuo*.

In testimony whereof I have signed my name to this specification in the presence of two subscribing witnesses.

EUGEN SCHAAL.

Witnesses:
JOHANN HENKES,
B. ROI.